(12) United States Patent
Tamura

(10) Patent No.: US 7,633,516 B2
(45) Date of Patent: *Dec. 15, 2009

(54) PORTABLE TERMINAL AND CONTROL METHOD FOR SAME

(75) Inventor: Kengo Tamura, Minato-ku (JP)

(73) Assignee: NEC Corporation, Tokyo (JP)

( * ) Notice: Subject to any disclaimer, the term of this patent is extended or adjusted under 35 U.S.C. 154(b) by 868 days.

This patent is subject to a terminal disclaimer.

(21) Appl. No.: 11/218,606

(22) Filed: Sep. 6, 2005

(65) Prior Publication Data

US 2006/0051053 A1 Mar. 9, 2006

(30) Foreign Application Priority Data

Sep. 7, 2004 (JP) ............................. 2004-260006

(51) Int. Cl.
 *H04N 7/14* (2006.01)
 *H04N 11/04* (2006.01)
(52) U.S. Cl. ............... 348/14.01; 348/14.02; 348/14.07
(58) Field of Classification Search ... 348/14.01–14.16, 348/486, 564; 375/240.13
 See application file for complete search history.

(56) References Cited

U.S. PATENT DOCUMENTS

| 5,408,273 A | 4/1995 | Okamura |
| 5,583,577 A * | 12/1996 | Tsukagoshi ................. 348/468 |
| 6,243,419 B1 * | 6/2001 | Satou et al. ............. 375/240.13 |
| 6,529,742 B1 | 3/2003 | Yang |
| 7,502,386 B2 * | 3/2009 | Goto .......................... 370/493 |

FOREIGN PATENT DOCUMENTS

| EP | 1 489 818 A1 | 12/2004 |
| JP | 06-165073 A | 6/1994 |
| JP | 07-123376 A | 5/1995 |
| JP | 10-042014 A | 2/1998 |
| JP | 2001-267954 A | 9/2001 |
| JP | 2003-259215 A | 9/2003 |
| JP | 2004-046664 A | 2/2004 |
| WO | WO 03/081878 A1 | 10/2003 |

* cited by examiner

*Primary Examiner*—Melur Ramakrishnaiah
(74) *Attorney, Agent, or Firm*—Sughrue Mion, PLLC

(57) ABSTRACT

A portable terminal having a content reproduction function is provided with: a speaker, a display, and a control circuit for, when the reproduction function is being executed in a state in which an operation mode for halting sound output from the speaker has been selected, both halting the output of sound from the speaker and displaying on the display a video picture and a caption that is relevant to the video picture.

6 Claims, 13 Drawing Sheets

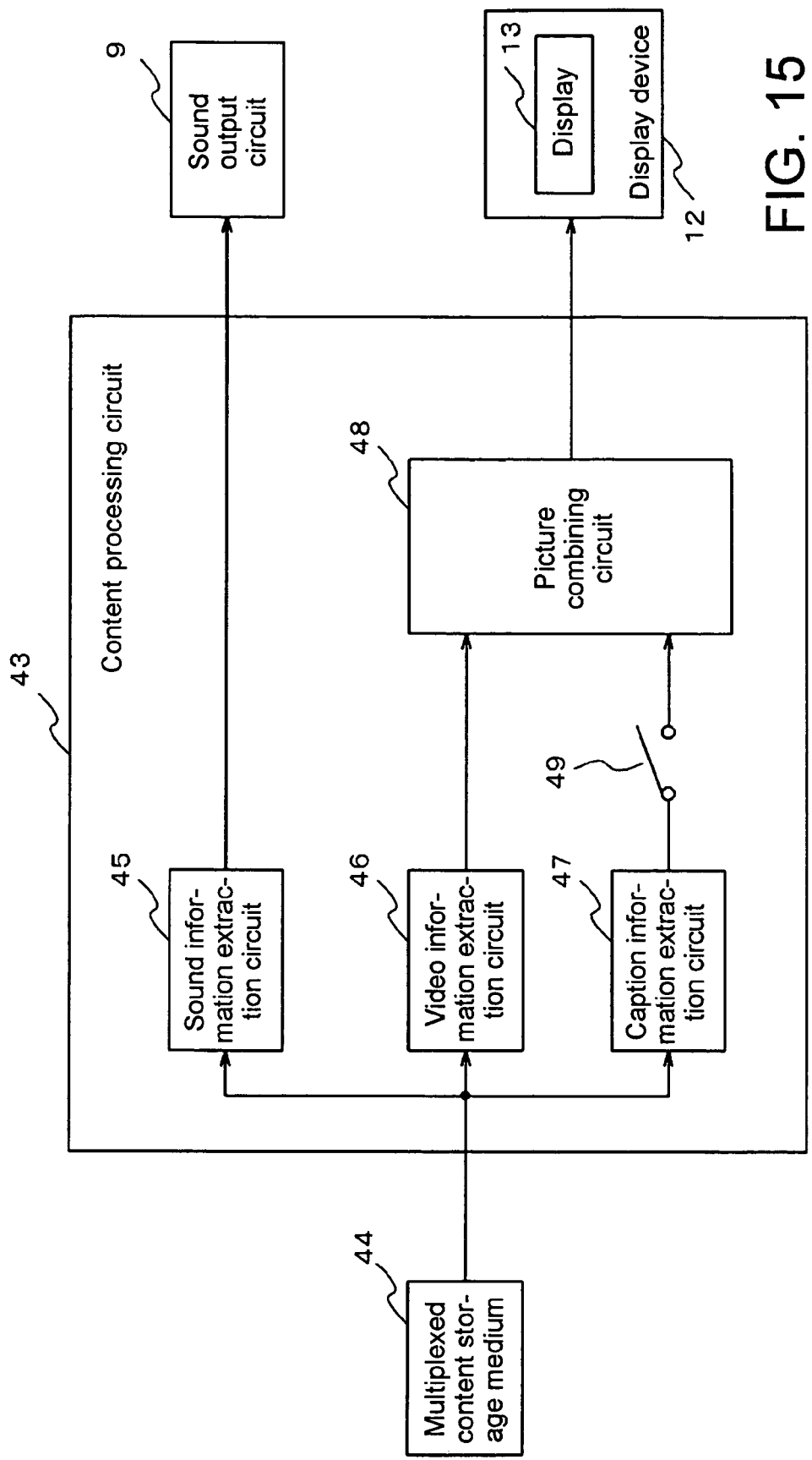

PORTABLE TERMINAL AND CONTROL METHOD FOR SAME

BACKGROUND OF THE INVENTION

1. Field of the Invention

The present invention relates to a portable terminal such as a portable telephone, and more particularly to portable terminal having a content reproduction function such as a television broadcast reception function.

2. Description of the Related Art

Typical portable terminals include portable telephones, PDAs (Personal Digital Assistants) and the like. Portable telephones, which are representative of portable terminals, include devices now in widespread use that are provided with various additional capabilities such as an Internet access function, mail transmission/reception function, camera function, and music reproduction function in addition to the original communication functions.

In recent years, portable telephones are coming into use that have the capability to receive television (TV) broadcasts. By using the TV reception capability, a user can easily view the news or watch TV programs that he or she watches on a weekly basis even when away from home.

In some cases depending on the environment of use, however, the user may wish to suppress the sound generated from the terminal. Various devices for presenting information to a user when the generation of sound from the terminal has been suppressed are proposed as follows:

In Japanese Patent Laid-Open Publication No. 2001-267954 (JP, P2001-267954A), a portable telephone is proposed that is provided with a sound generation prevention mode as one operation mode, and further, that, when the operation mode is in the sound generation prevention mode, prevents output of the ring tone when a connection is realized and displays on a display a telephone number or characters realized by a character information service.

In Japanese Patent Laid-Open Publication No. 2004-046664 (JP, P2004-046684A), an information processor is proposed that not only prohibits sound output by means of a speaker when a speaker is accommodated inside the device, but also realizes display in which subtitles or captions corresponding to the sound that is to be supplied as output are superposed on the displayed image on a display.

In Japanese Patent Laid-Open Publication No. H06-165073 (JP, 6-165073A), a technique in a TV set having a caption function is disclosed in which, in accordance with a mute selection operation by user, the output of sound is halted, and a subtitle or caption is displayed together with a TV picture.

In Japanese Patent Laid-Open Publication No. H07-123376 (JP, 7-123376A), a technique in a teletext-receiver is disclosed in which, in accordance with a mute selection operation by the user, sound output is halted and a subtitle or caption is displayed together with a TV picture.

In some cases, the output of sound from the speaker provided in a portable telephone is not desirable depending on the user's surrounding environment, such as during travel by means of a public transportation facility. In such cases, a portable telephone of the prior art typically, in accordance with the user's selection of what is referred to as "silent mode," prohibits the output of the ring tone from the speaker and drives a vibrator for reporting an incoming call.

If a device is considered in which a TV reception function is provided in a portable telephone having this type of silent mode capability, it naturally follows that when the silent mode has been selected, the output of sound accompanying a TV program that is being reproduced in the device should also be halted.

However, viewing a muted TV program that is meant to be accompanied by sound interferes with the comprehension of the content, and may render the function virtually meaningless to the user. In such cases, the typical mode of use is to use earphones to listen to the sound that is to be supplied as output from a speaker. However, the series of operations from connecting an earphone to the portable telephone to fitting the earphone to the user's ear can be an inconvenience to the user. Then, once fitted, the earphone may cause the user to miss onboard announcements or may hinder the user's perception of the surrounding environment, and many users therefore dislike using earphones when traveling on public conveyances such as railways.

SUMMARY OF THE INVENTION

It is an object of the present invention to provide a portable terminal having a content reproduction function that allows a user to easily and reliably comprehend the content that is being reproduced even when an operation mode has been selected that halts the output of sound from a speaker.

It is another object of the present invention to provide a method which is a control method of a portable terminal having a content reproduction function and which allows a user to easily and reliably comprehend the content that is being reproduced even when an operation mode for halting the output of sound from a speaker has been selected.

The first object of the present invention is achieved by a portable terminal having a content reproduction function wherein the portable terminal includes: a speaker; a display; and a control means for, when the reproduction function is being executed in a state in which an operation mode for halting output of sound from the speaker has been selected, both halting the output of sound from the speaker and displaying, on the display, a video picture and a caption or subtitle which relates to the video picture.

The second object of the present invention is achieved by a method for controlling a portable terminal having a content reproduction function, the method comprising the step of: when the reproduction function is being executed in a state in which an operation mode for halting output of sound from the speaker has been selected, halting the output of sound from the speaker while displaying, on a display, a video picture and a caption or subtitle which relates to the video picture.

The content in the present invention may be includes, for example, the content data of a video picture, sound, and a caption. In addition, in the following explanation, the operation mode for halting the output of sound from a speaker in a portable terminal is also referred to as the "silent mode."

The present invention enables a user to easily and reliably comprehend the content that is being reproduced even when the silent mode has been selected as the operation mode of the potable terminal.

The above and other objects, features, and advantages of the present invention will become apparent from the following description with reference to the accompanying drawings which illustrate an example of the present invention.

BRIEF DESCRIPTION OF THE DRAWINGS

FIG. 15 is a block diagram showing the internal configuration of the content processing circuit provided in the portable telephone of the fourth embodiment.

DETAILED DESCRIPTION OF THE PREFERRED EMBODIMENTS

In the following explanation, a portable telephone having a TV reception function is described in the first to third embodiments as one example of a portable terminal having a content reproduction function. In the fourth embodiment, portable telephone having a multiplex content reproduction function is described as an example of a portable terminal having a content reproduction function.

First Embodiment

After an explanation of the device configuration of portable telephone 100 according to the first embodiment with reference to FIGS. 1 and 2, details of the operation of this device are explained with reference to FIGS. 3 to 7.

Figure 1:
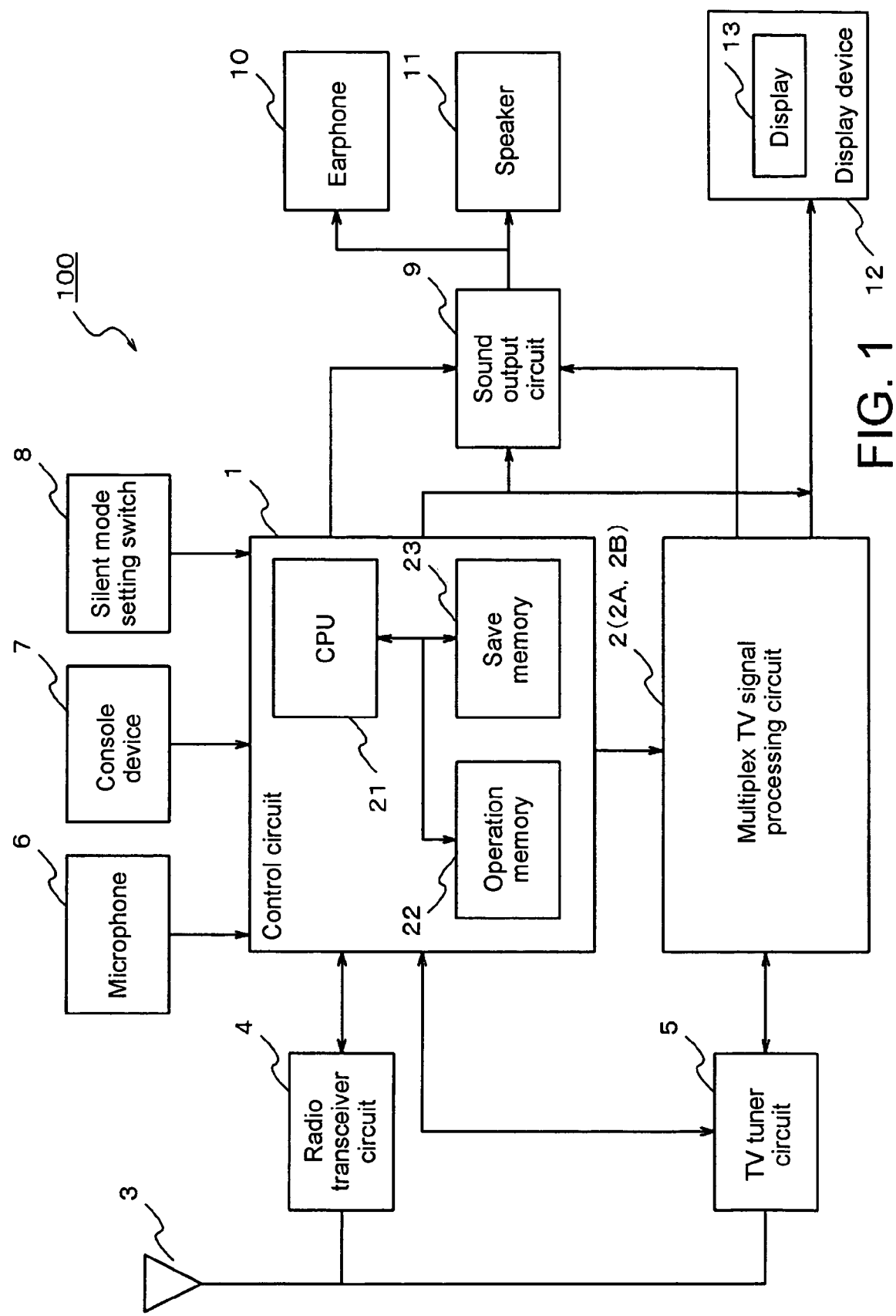
FIG. 1 is a block diagram showing the overall configuration of a first embodiment of the present invention that has a television broadcast reception function.

Device Configuration of Portable Telephone 100:

FIG. 1 shows the overall configuration of portable telephone 100 of the first embodiment of the present invention that has a TV reception function. Portable telephone 100 is provided with: control circuit 1, multiplex TV signal processing circuit 2, antenna 3, radio transceiver circuit 4, TV tuner circuit 5, microphone 6, console device 7, silent mode setting switch 8, sound output circuit 9, earphone 10, speaker 11, display device 12, and display 13.

More specifically, control circuit 1 is provided with: CPU (Central Processing Unit) 21, operation memory 22, save memory 23, and other hardware not shown in the figure. In control circuit 1, CPU 21 controls the operations of the various components of portable telephone 100 through the execution of programs that have been read from save memory 23. In other words, CPU 21 of control circuit 1 reports an incoming call by detecting its own call number from a signal that has been demodulated by radio transceiver circuit 4. At this time, CPU 21 uses the calling number (calling party number) that has been read from save memory 23 to collate data corresponding to the prescribed position of the demodulated signal. CPU 21 of control circuit 1 further processes a sound signal or a digital data signal to realize: voice conversation that uses microphone 6 and speaker 11, data transmission such as a mail transmission and reception function or a server connection function, and a TV reception function. Earphone 10 may also be used in place of speaker 11. The user may apply and set instructions to CPU 21 of control circuit 1 by way of console device 7 and silent mode setting switch 8. When CPU 21 executes programs that have been read to operation memory 22, CPU 21 operates in accordance with the user's instructions.

Operation memory 22 is typically a RAM (Random Access Memory) and is used as the work memory area during operation of CPU 21. Save memory 23 may be realized by a nonvolatile memory such as flash memory, and stores, for example, the operation programs of CPU 21, the calling number (calling party number) of its own device, various parameters such as preset frequencies for TV channel selection, and user data. Examples that can be offered of user data include mail documents and telephone directory data. In some cases, portions of operation memory 22 and save memory 23 are realized by appropriately dividing the memory area inside a device that is physically the same device.

Console device 7 includes a plurality of operation buttons (not shown) by which the user applies information as input. Console device 7 is used for input of a telephone number by the user when realizing voice conversation, for channel selection operation during TV reception, and for the input of settings of various functions.

Figure 5:
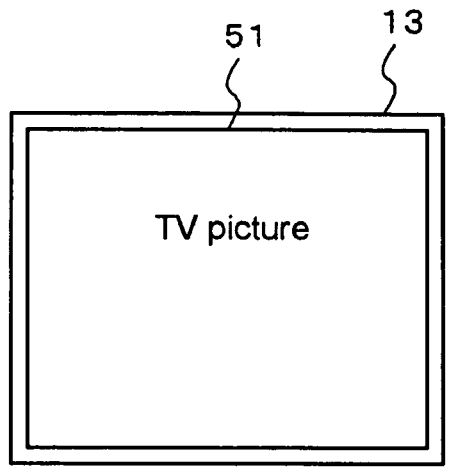
FIG. 5 is an explanatory view showing a case in which only a TV picture is displayed in the portable telephone of the first embodiment.
Figure 6:
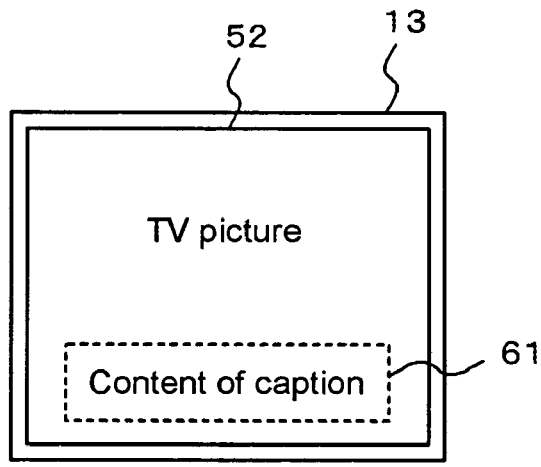
FIG. 6 is an explanatory view showing the superposed display of the TV picture and a caption as a combined picture which is realized when the silent mode has been selected in the portable telephone of the first embodiment.
Figure 7:
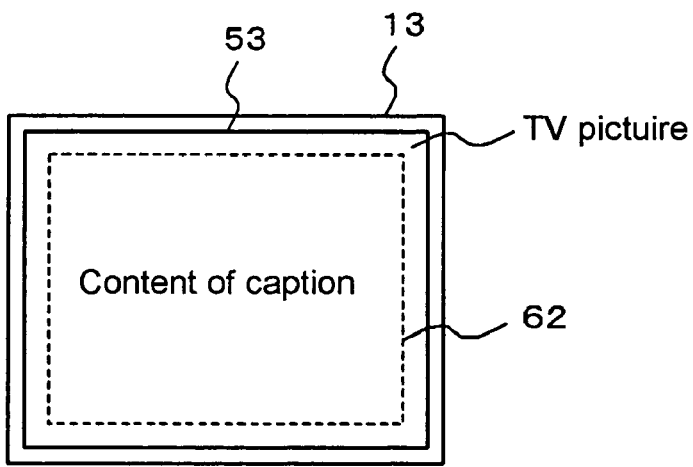
FIG. 7 is an explanatory view showing the emphasized display of a caption as compared to the TV picture which is realized when the silent mode has been selected in the portable telephone of the first embodiment.

Display device 12 includes display 13 such as a liquid crystal display (LCD). Display device 12 displays on display 13 the content of various input in concert with the manipulation of console device 7 by the user. Display device 12 further displays a video picture on display 13 based on the video signals supplied as output from multiplex TV signal processing circuit 2 when in a state in which the TV reception function has been selected. Examples of the display of a video picture are shown in FIGS. 5 to 7 as will be explained hereinbelow.

When the TV reception function has been selected, multiplex TV signal processing circuit 2 performs signal processing such as sound output and generation of a combined video picture that are characteristics of the present embodiment, as will be explained hereinbelow, in accordance with the instructions of control circuit 1.

Other than transmitting and receiving radio waves that have undergone phase modulation, antenna 3 has functions that are the same as an antenna of a known radio communication terminal. In addition, antenna 3 receives a multiplexed TV signal in the present embodiment. Here, a multiplexed TV signal is a signal based on prescribed standards in which a video signal, a sound signal, and a caption signal have been multiplexed (combined) in advance. In addition, the antenna for the wireless telephone and the antenna for TV reception may be separate entities.

Radio transceiver circuit 4 performs demodulation of radio waves for the wireless telephone that have been received by way of antenna 3 and performs phase modulation of digital signals that have been supplied as output from control circuit 1. Radio transceiver circuit 4 has the same functions as the radio transceiver circuit of a known radio communication terminal.

TV tuner circuit 5 detects and demodulates radio waves for TV that have been received by way of antenna 3 in accordance with the instructions (such as channel selection instructions) from control circuit 1 when the TV reception function has been selected.

The user's voice is applied as input to microphone 6. Speaker 11 supplies sound or voice as output during conversation and during TV reception in accordance with the sound signals supplied from sound output circuit 9. Earphone 10 can be connected or disconnected from portable telephone 100 and can be used in place of sound output to speaker 11. Earphone 10 is assumed to include headphone speakers.

Sound output circuit 9 performs processing such as sound synthesis during execution of the conversation function, switching of the destination of sound output during execution of the TV reception function, and the halting and resumption of sound output in accordance with instructions from control circuit 1.

Silent mode setting switch 8 is a switch by which the user instructs control circuit 1 of the transition to an operation mode that halts the sound output from at least speaker 11. This operation mode is referred to as the silent mode, as previously described.

In the above-described device configuration, portable telephone 100 can currently adopt typical techniques for operations such as data transmission/reception processing executed with an external devices, sound processing, and reception processing of a multiplexed TV signal by means of TV tuner circuit 5, and a detailed explanation of these operations in the present embodiment is therefore here omitted.

Figure 2:
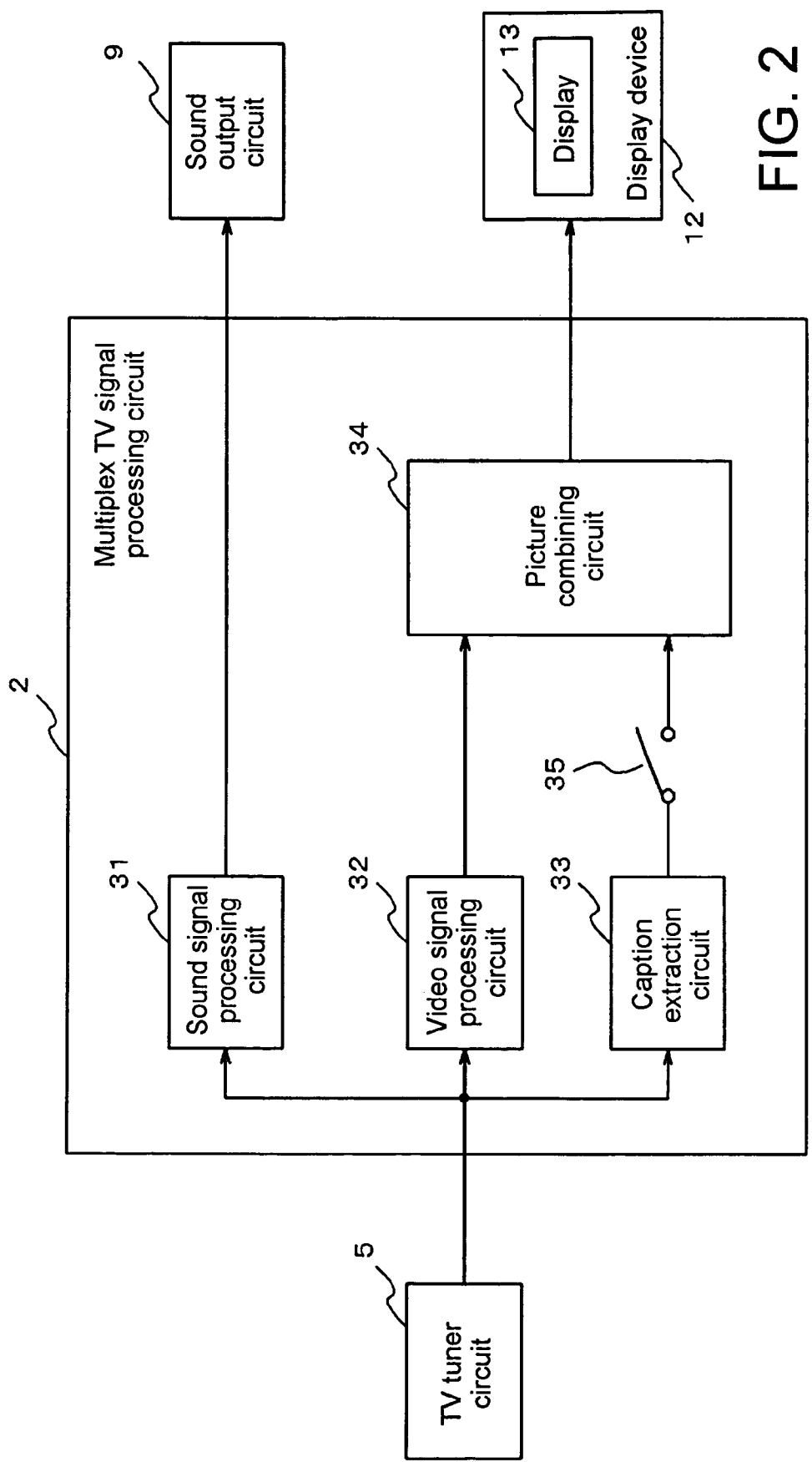
FIG. 2 is a block diagram showing the internal configuration of a multiplex TV signal processing circuit provided in the portable telephone of the first embodiment.

Circuit Configuration of Multiplex TV Signal Processing Circuit 2:

The following explanation regards multiplex TV signal processing circuit 2 with reference to FIG. 2.

Multiplex TV signal processing circuit 2 is provided with: sound signal processing circuit 31, video signal processing circuit 32, caption extraction circuit 33, picture combining circuit 34, and switch 35. Multiplex TV signal processing circuit 2 separates and extracts a video signal, sound signal, and caption signal from the multiplex TV signal that has been demodulated by TV tuner circuit 5.

Sound signal processing circuit 31 separates the sound signal from the multiplexed TV signal, and further, performs the digitization of this sound signal and performs level conversion in accordance with the instructions of control circuit 1. The digital sound signal (sound information) that has undergone the processing by sound signal processing circuit 31 is supplied to sound output circuit 9.

Video signal processing circuit 32 separates the video signal from the multiplex TV signal, and further, after converting this video signal to a digital signal, supplies the signal to picture combing circuit 34. Video signal processing circuit 32 has the function of separating the digital video signal into a luminance (Y) signal and a color (C) signal.

Caption extraction circuit 33 separates a caption signal from the multiplexed TV signal and, after converting this caption signal to a digital signal, supplies the digital signal to picture combining circuit 34 by way of switch 35. Typically, the content of a caption is relevant to the content of the video frames to which the caption belongs.

Switch 35 is composed of a switch element, and by means of ON/OFF operation in accordance with the instructions of control circuit 1, switches between supplying and halting the supply of caption information to picture combining circuit 34.

Picture combining circuit 34, by combining the digital video signal (video information) that is supplied by video signal processing circuit 32 with caption information that has been supplied by caption extraction circuit 33 when switch 35 is in the ON state, generates video information of the TV picture that is to be displayed on display 13. On the other hand, when switch 35 is in the OFF state, picture combining circuit 34 uses only the video information that is supplied by video signal processing circuit 32 to generate video information of the content picture that is to be displayed on display 13. Picture combining circuit 34 further converts video information to RGB signals as necessary according to the specifications of display device 12.

Operation Control Process:

The following explanation regards the operation control process performed by control circuit 1 in portable telephone 100 that is provided with the above-described device configuration.

Figure 3:
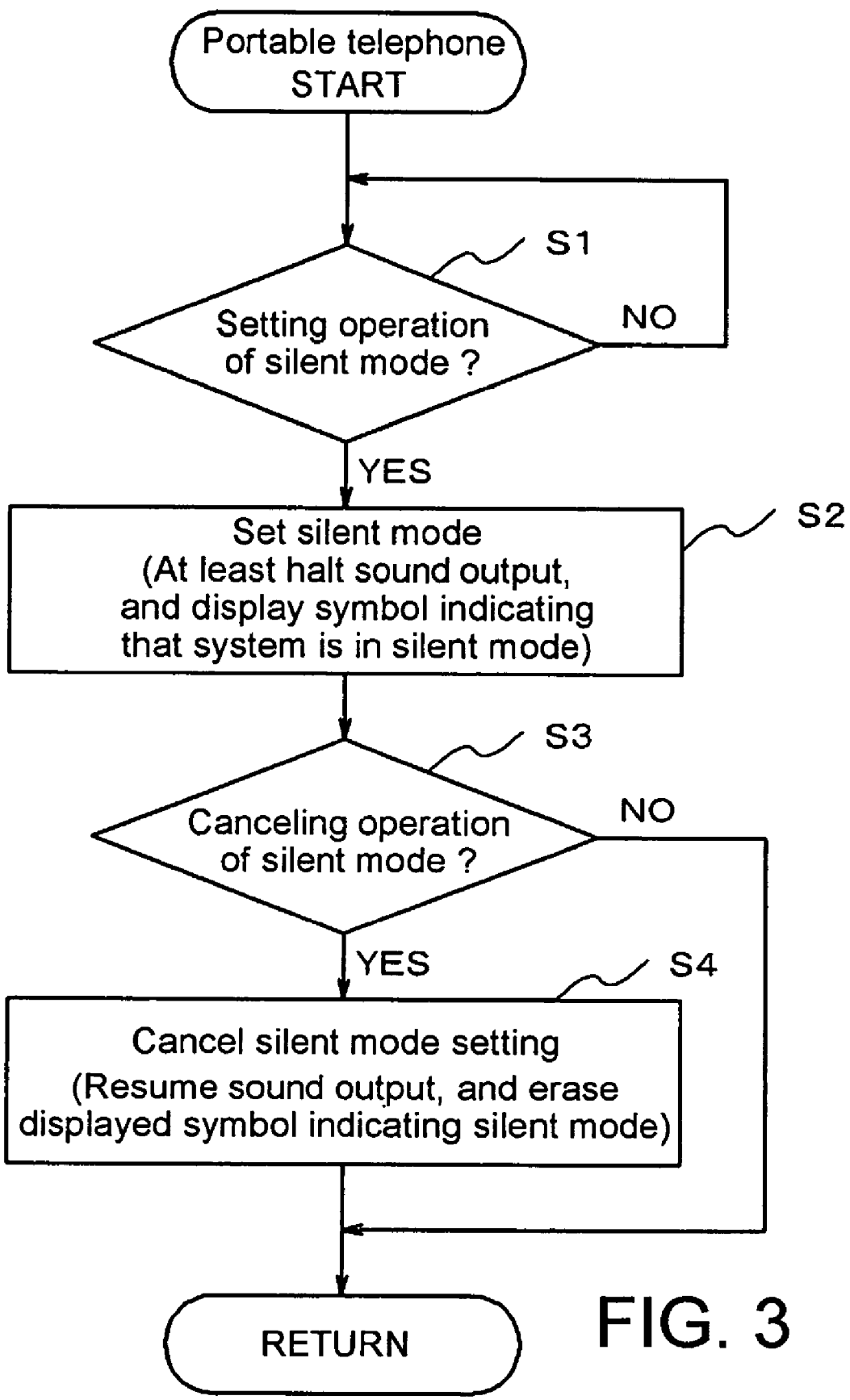
FIG. 3 is a flow chart showing the control process when the silent mode has been selected in the portable telephone of the first embodiment.

FIG. 3 shows the control process when the silent mode has been selected in a portable telephone of the first embodiment. The flow chart shown in FIG. 3 represents the procedure of the software program that is executed by CPU 21 in control circuit 1 shown in FIG. 1.

In control circuit 1, CPU 21 detects whether silent mode setting switch 8 has been manipulated or not in Step S1. If CPU 21 detects that silent mode setting switch 8 has been manipulated, CPU 21 causes portable telephone 100 to make the transition of the operation mode to the silent mode in Step S2. In the silent mode, CPU 21 halts the sound output from at least speaker 11 and displays a prescribed symbol on display 13 to allow the user to recognize that the device is in silent mode. Because the display of a prescribed symbol that indicates the operation mode on the display is now typical, the display of this prescribed symbol has been omitted in the display manner shown by example in FIGS. 5, 6, 7, 10 and 13 which will be explained later.

CPU 21 subsequently detects whether silent mode setting switch 8 is again manipulated or not in Step S3. Upon detecting that silent mode setting switch 8 has again been manipulated, CPU 21 cancels the silent mode in Step S4. In other words, in Step S4, CPU 21 both resumes sound output from speaker 11 and cancels the display of the symbol indicating silent mode that was displayed on display 13.

Figure 4:
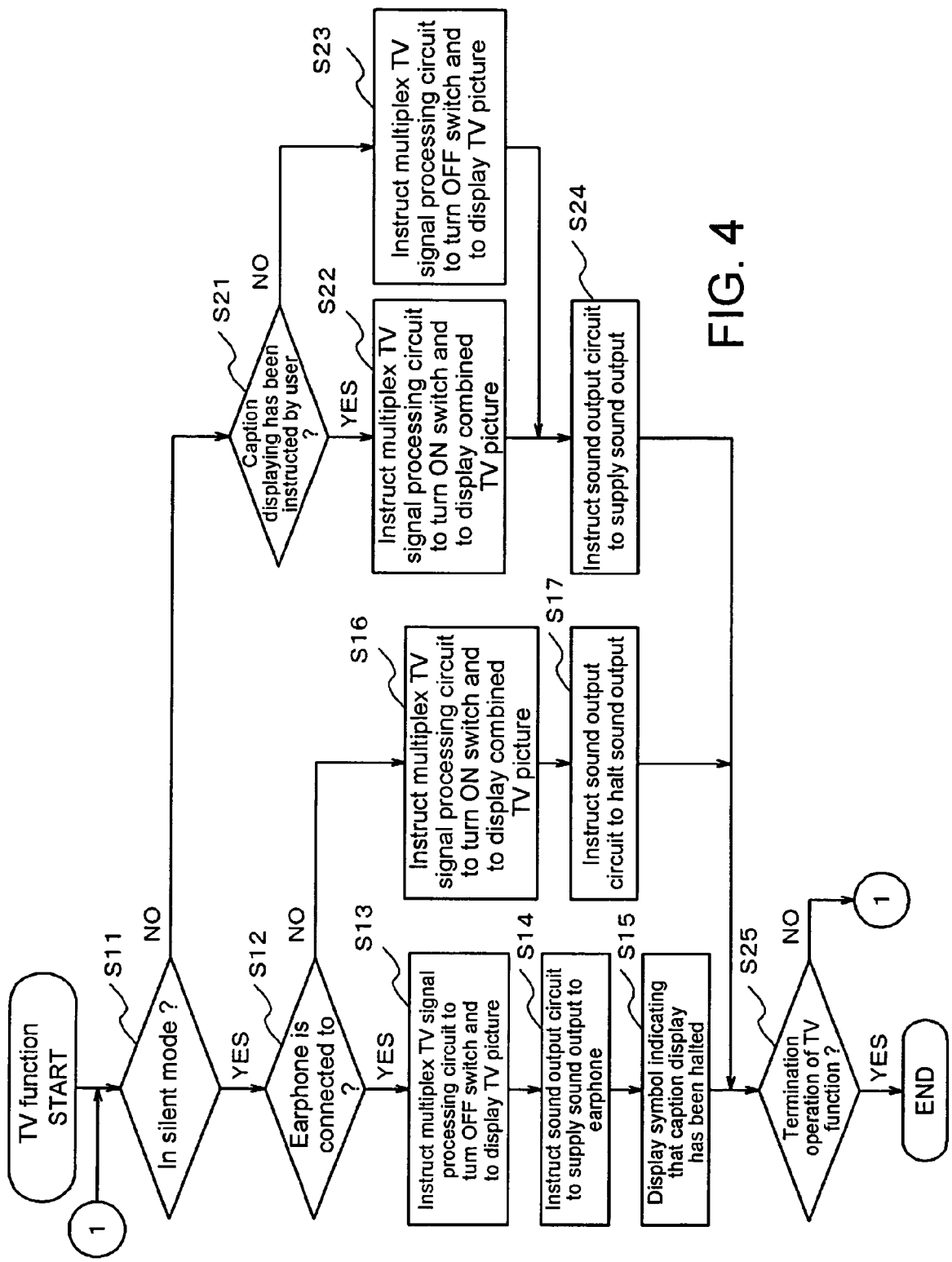
FIG. 4 is a flow chart showing the control process when the TV function has been selected in the portable telephone of the first embodiment.

FIG. 4 shows the control process when the TV function has been selected in the portable telephone of the first embodiment. The flow chart shown in FIG. 4 shows the procedure of the software program that is executed by CPU 21 when the execution of the TV reception function has been instructed by a prescribed operation to console device 7.

In control circuit 1, CPU 21 determines in Step S11 whether the operation mode of portable telephone 100 is the silent mode or not. CPU 21, having determined the silent mode, determines in Step S12 whether earphone 10 is connected to the body of portable telephone 100.

Explanation here regards a method of detecting the state of connection/disconnection of earphone 10. The body of portable telephone 100 is provided with an earphone jack (not shown) having a contact that turns ON/OFF according to the connected state of earphone 10, and is provided with an interface that reports the state of this contact to control circuit 1 (i.e., CPU 21) as an electrical signal. In Step S12, CPU 21 can recognize the electrical signal indicating the state of this contact by means of an interruption circuit.

Upon determining that earphone 10 is connected to the body in Step S12, CPU 21 carries out the processes of Step S13 to S15. Specifically, in Step S13, CPU 21 instructs multiplex TV signal processing circuit 2 to turn OFF switch (SW) 35 and instructs the display of a TV picture. In accordance with these instructions, the supply of caption information from caption extraction circuit 33 is halted, and picture combining circuit 34 therefore supplies video information having content that is identical to the video signal that has been extracted from multiplexed TV signals to display device 12.

FIG. 5 shows the state when only the TV picture is displayed on the portable telephone of the first embodiment. Data processing device 12, in accordance with the above-described instructions from CPU 21 to multiplex TV signal processing circuit 2 in Step S13, displays, over the entire display area of display 13 as shown in FIG. 5, TV picture 51 based on video information.

Next, in Step S14, CPU 21 instructs sound output circuit 9 to supply the sound output to earphone 10. In Step S15, CPU 21 causes the display of a prescribed symbol on display 13 to report to the user that caption display has been halted. The process then advances to Step S25, to be explained below.

Upon determining that earphone 10 is not connected to the body in Step S12, CPU 21 performs the processes of Steps S16 to S17. In Step S16, CPU 21 both instructs multiplex TV signal processing circuit 2 to turn ON switch 35 (SW) and instructs the display of a combined TV picture. In accordance with these instructions, the caption information from caption extraction circuit 33 is supplied to picture combining circuit 34, and picture combining circuit 34 therefore supplies to display device 12 combined video information in which video information of the same content as the video signal that was extracted from the multiplexed TV signals is combined with the caption information.

FIG. 6 shows the state of the superposed display of a TV picture and caption 61 as combined picture 52 realized by execution of the TV function when the silent mode has been selected in the portable telephone of the first embodiment. The position of caption display area 61 is not limited to the location that is shown in FIG. 6.

CPU 21 next instructs the halt of the sound output to sound output circuit 9 in Step S17, following which the process advances to Step S25, described hereinbelow.

Continuing the explanation of the control process that is shown in FIG. 4, in the present embodiment, the user is able to make settings beforehand in portable telephone 100 to display captions in operation modes other than the silent mode. When it is determined that the operation mode is not the silent mode in the above-described Step S11, CPU 21 determines in Step S21 whether these caption display settings have been registered or not.

If CPU 21 determines that these caption display settings have been made, CPU 21 both instructs multiplex TV signal processing circuit 2 to turn ON switch 35 (SW) and instructs the display of the combined TV picture in Step S22. In this way, a TV picture of the same display manner as the above-described Step S16 (refer to FIG. 6) is displayed on display 13. On the other hand, if it is determined in Step S21 that the caption display settings have not been made, CPU 21 instructs multiplex TV signal processing circuit 2 to turn OFF switch 35 (SW) in Step S23 and instructs the display of a TV picture. In this way, a TV picture of the same display manner as the above-described Step S13 (see FIG. 5) is displayed on display 13.

In Step S24, CPU 21 next instructs sound output circuit 9 to supply output of sound to speaker 11 regardless of whether caption display is performed (Step S22) or not performed (Step S23). The process then advances to Step S25.

In Step S25, CPU 21 detects whether the termination operation of the TV function has occurred or not. If the termination operation of the TV function is detected, the above-described series of processes is terminated. On the other hand, if the termination operation is not detected, CPU 21 returns the process to Step S11 and repeats the above-described series of processes.

Thus, in the present embodiment, when the TV reception function is being executed in a state in which the silent mode has been selected, the processes of the above-described Steps S16 and S17 cause both the halt of the output of sound from speaker 11 and the display of a TV picture in which a caption is combined (see FIG. 6).

In addition, even when the TV reception function is being executed in a state in which the silent mode has been selected, the processes of Steps S13 to S15 cause the termination of the display of captions on display 13 and the display of the original TV picture that has been received (see FIG. 5) when the connection of earphone 10 to portable telephone 100 is detected.

In other words, by means of portable telephone 100 of the present embodiment, when the silent mode (i.e., an operation mode in which at least the output of sound from speaker 11 is halted) has been selected and earphone 10 is not connected while the TV reception function is being executed, a combined TV picture that includes a caption is displayed on display 13 in place of the output of sound from speaker 11. Accordingly, even when the silent mode has been selected, the user can easily and reliably comprehend the content of a TV program that is being reproduced by means of a TV picture in which a caption has been combined.

Modification of the First Embodiment

In a portable terminal such as a portable telephone, however, the size of a display, i.e., the size of the display area, is limited so as to allow easy transport by the user. Thus, when a combined TV picture is displayed in which a picture and a caption are superposed as in the example of the display manner shown in FIG. 6, problems can be anticipated regarding the visibility of the displayed captions due to such factors as the user's eyesight or a viewing environment such as the interior of a moving railway car. In the present modification, the captions are displayed with emphasis so as to enhance visibility.

FIG. 7 is an explanatory view of the state of the emphasized display of a caption compared to the TV picture that is realized by the execution of the TV function when the silent mode has been selected in the portable telephone of the modification of the first embodiment. More specifically, in the combined picture shown in FIG. 7, caption display area 62 is enlarged to a size that is close to the displayed size of TV picture 53. This form of display produces an effect in addition to the effect of the above-described first embodiment by which the size of the character string displayed in the caption is greater than that shown in the case of FIG. 6, thus realizing superior visibility of the caption and enabling better comprehension of the content of the caption. In addition, a form of display in which the brightness of the picture that is the background is decreased to render the display of the caption more prominent is also effective.

According to a modification of this type, a TV picture in which a caption having a larger display size has been combined enables the user to easily and reliably comprehend the content of the TV program that is being reproduced.

Second Embodiment

The following explanation regards the second embodiment, which takes portable telephone 100 of the above-described first embodiment as a basis.

In TV broadcasts in recent years, character strings (including numbers) that are relevant to the TV picture are frequently included in the original TV picture (TV video frame) that is to be displayed, these character strings obviously being extremely convenient for elderly viewers and people with impaired hearing, and also extremely convenient for people with no disabilities but who wish to set a temporary muted state. In such cases, it can be anticipated that the display of a combined TV picture as in the above-described first embodiment will result in the overlap of the character string and caption and a consequent degradation of ability to comprehend the content. These circumstances can be expected to further hinder a user's comprehension of the content of the TV picture.

In the second embodiment, however, overlap between the character string that was originally included in the TV picture and a caption that is based on a caption signal extracted from the received multiplexed TV signal is prevented in the displayed TV picture.

The following explanation focuses on the characteristic portion of the portable terminal of the second embodiment. In this explanation, components that are the same as in the above-described first embodiment are given the same reference numerals, and redundant explanation is omitted.

Figure 8:
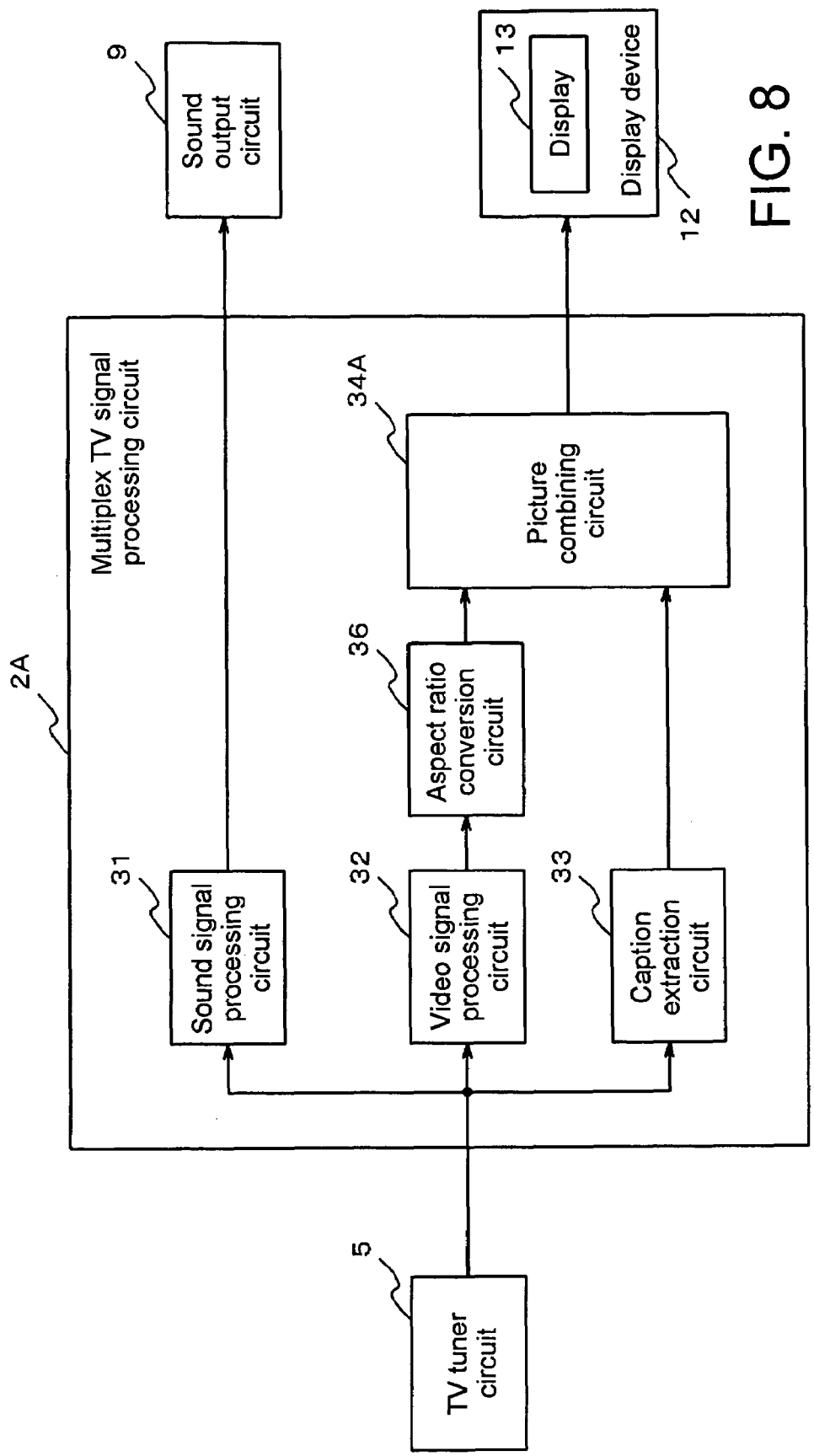
FIG. 8 is a block diagram showing the internal configuration of the multiplex TV signal processing circuit provided in a portable telephone according to a second embodiment of the present invention.

Circuit Configuration of Multiplex TV Signal Processing Circuit 2A:

FIG. 8 shows the internal configuration of the multiplex TV signal processing circuit provided in the portable telephone of the second embodiment. The overall configuration of the portable telephone of this embodiment is similar to that of portable telephone 100 of the above-described first embodiment (refer to FIG. 1), and only a portion of the internal configuration of multiplex TV signal processing circuit 2A and a portion of the control process of the TV reception function are different.

The points of difference between multiplex TV signal processing circuit 2A of the second embodiment and multiplex TV signal processing circuit 2 of the first embodiment are the provision of aspect ratio conversion circuit 36 between video signal processing circuit 32 and picture combining circuit 34A and the lack of switch 35.

Aspect ratio conversion circuit 36 is a circuit for converting a prescribed aspect ratio in the video signal in the multiplexed TV signal that has been demodulated in TV tuner circuit 5. A typical procedure can be adopted for modifying the aspect ratio in the video signal, and a detailed explanation is therefore omitted in the present embodiment. The function of aspect ratio conversion circuit 36 may be realized in video signal processing circuit 32 or picture combining circuit 34 as necessary.

Picture combining circuit 34A generates video information that is to be displayed on display 13 by combining a digital video signal (video information) in which the aspect ratio has been modified by aspect ratio conversion circuit 36 and caption information that has been received from caption extraction circuit 33. Picture combining circuit 34A further converts the video information to an RGB signal according to the specifications of display device 12 as necessary.

Figure 9:
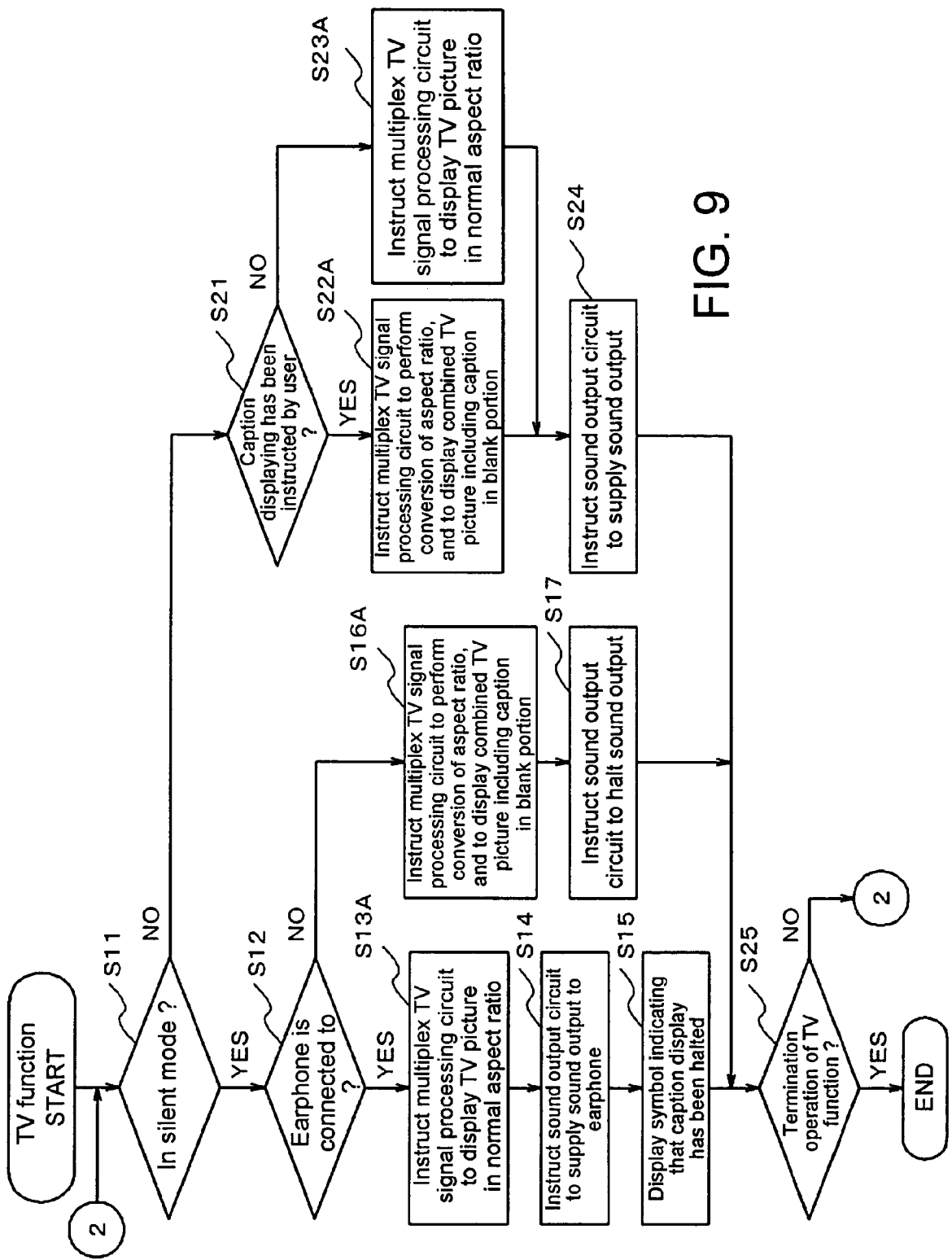
FIG. 9 is a flow chart showing the control process when the TV function has been selected in the portable telephone of the second embodiment.

Operation Control Process:

FIG. 9 shows the control process when the TV function is selected in the portable telephone of the second embodiment. The flow chart shown in FIG. 9 shows the procedures of the software program that is executed by CPU 21 in the present embodiment. The composition of the procedure shown in FIG. 9 is substantially the same as the procedure shown in FIG. 4 in the first embodiment, and differs from the first embodiment only in that Step S13A is executed in place of Step S13, Step S16A is executed in place of Step S16, Step S22A is executed in place of Step S22, and Step S23A is executed in place of Step S23. In other words, CPU 21 of control circuit 1 instructs multiplex TV signal processing circuit 2A to display a TV picture according to the normal aspect ratio in Step S13A and Step S23A. In Step S16A and Step S22A, CPU 21 instructs multiplex TV signal processing circuit 2A to both convert the aspect ratio and display a combined TV picture that includes a caption in a blank area that has been generated by this conversion.

Figure 10:
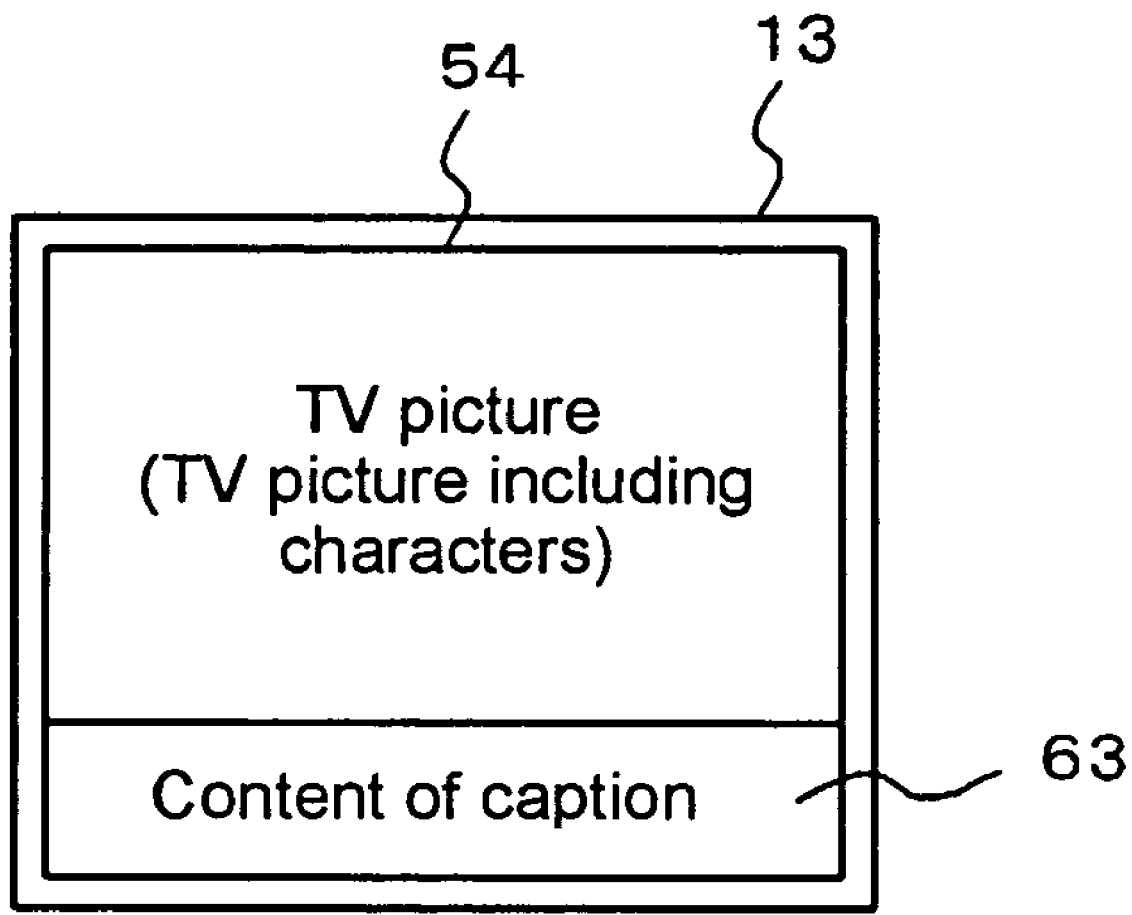
FIG. 10 is an explanatory view showing the state of the display when a TV picture in which the aspect ratio has been converted and a caption in the blank portion are displayed as a combined video picture which is realized when the silent mode has been selected in the portable telephone of the second embodiment.
Figure 11:
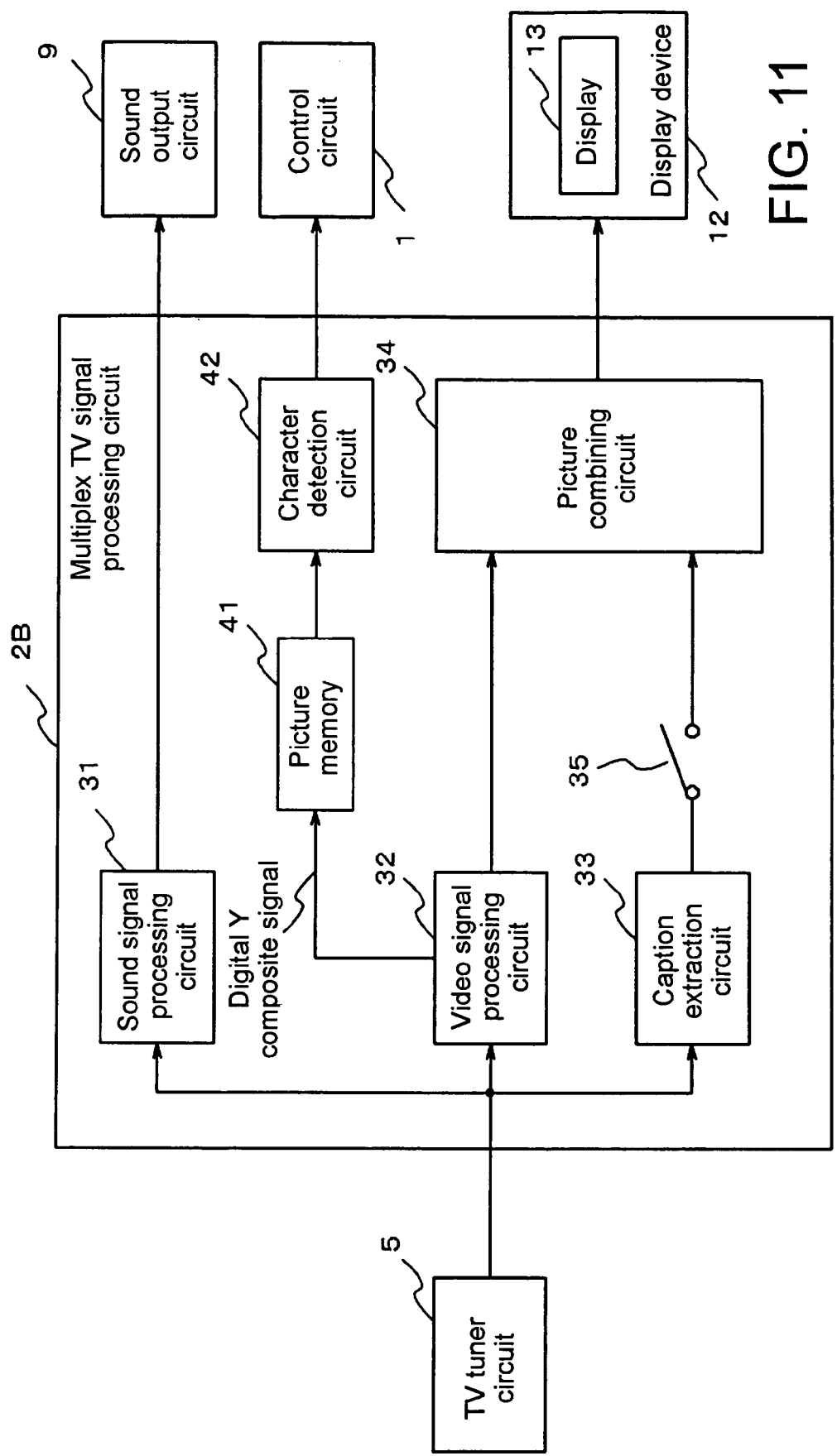
FIG. 11 is a block diagram showing the internal configuration of the multiplex TV signal processing circuit provided in the portable telephone according to a third embodiment of the present invention.

FIG. 10 is an explanatory view showing the state of display in which TV picture 54 whose aspect ratio has been converted and a caption in blank portion 63 are displayed as a combined picture that is realized by the execution of the TV function when the silent mode has been selected in the portable telephone of the second embodiment.

In this embodiment, the processing of the above-described Step S16A and Step S17 when the TV reception function is being executed in a state in which the silent mode has been selected results in the halting of the output of sound from speaker 11 and the display on display 13 of a TV picture in which a caption has been combined in the blank portion (see FIG. 10). In addition, according to the processing of the above-described Steps S13A to S15, when earphone 10 is connected to portable telephone 100, the display of captions to display 13 is halted and the original TV picture that was received (see FIG. 5) is displayed even when the TV reception function is being executed in the state in which the silent mode has been selected.

In other words, according to portable telephone 100 of the present embodiment, when the TV reception function is being executed without the use of earphone 10 when the silent mode has been selected, a combined TV picture including a caption (see FIG. 10) is displayed on display 13 instead of sound output from speaker 11. Accordingly, even when the silent mode has been selected, the user can easily and reliably comprehend the content of the TV program that is being reproduced by means of TV picture 54 in which the aspect ratio has been converted and the caption (caption picture) that is displayed in blank portion 63.

Because the TV picture and the caption are displayed in a separated state as shown in the example of FIG. 10, the present embodiment is particularly suitable for a case in which a character string is originally included in the TV picture that is to be displayed. In other words, in the case of a superposed display (FIGS. 6 and 7) as in the first embodiment and its modifications, such a character string overlaps with the caption that has been extracted by caption extraction circuit 33 and creates problems regarding visibility. In contrast, the present embodiment can avoid this problem.

Third Embodiment

The following explanation regards the third embodiment, which takes the above-described portable telephone 100 of the first embodiment as its basis. The third embodiment precisely and dynamically prevents overlapping, in the displayed TV picture, between the character string originally included in the TV picture and a caption based on a caption signal that has been extracted from the received multiplexed TV signal.

The following explanation focuses on the characteristic parts of the portable terminal of the third embodiment. Elements that are identical to those of the above-described first embodiment are given the same reference numbers, and redundant explanation is omitted.

Circuit Configuration of Multiplex TV Signal Processing Circuit 2B:

FIG. 10 shows the internal configuration of the multiplex TV signal processing circuit provided in the portable telephone of the third embodiment. The overall configuration of the portable telephone of the present embodiment is similar to that of portable telephone 100 of the above-described first embodiment (see FIG. 1), and differs only in a portion of the internal configuration of multiplex TV signal processing circuit 2B and the control process of the TV reception function.

The point of difference between multiplex TV signal processing circuit 2B of the third embodiment and multiplex TV signal processing circuit 2 of the first embodiment is the additional provision of picture memory 41 and character detection circuit 42.

Picture memory 41 is a memory for temporarily and sequentially storing a digital Y composite signal (i.e., luminance information) that has been extracted by video signal processing circuit 32. In other words, in the present embodiment, video signal processing circuit 32 is provided with a Y/C separation circuit (not shown) for separating luminance information (Y) and color information (C) from a video signal that has been separated from the multiplexed TV signal.

Of the digital Y composite signal that has been temporarily stored in picture memory 41, character detection circuit 42 detects the data portion that is equal to or greater than a prescribed luminance level as characters. Numerals are included among the characters that are detected. In addition, these data portions may be compared with character patterns that have been stored in advance to improve detection accuracy.

Control circuit 1 can recognize the existence of character strings that are originally contained in the picture represented by the video signal that have been separated from the received multiplexed TV signal by means of this type of detection. In addition, the functions of character detection circuit 42 may also be realized by software executed by CPU 21 in control circuit 1.

The operations of caption extraction circuit 33 and picture combining circuit 34 in the present embodiment are similar to those of the first embodiment. However, the present embodiment differs from the first embodiment in that control circuit 1 controls the operation state of switch 35 in accordance with the detection results of the above-described character detection circuit 42.

Figure 12:
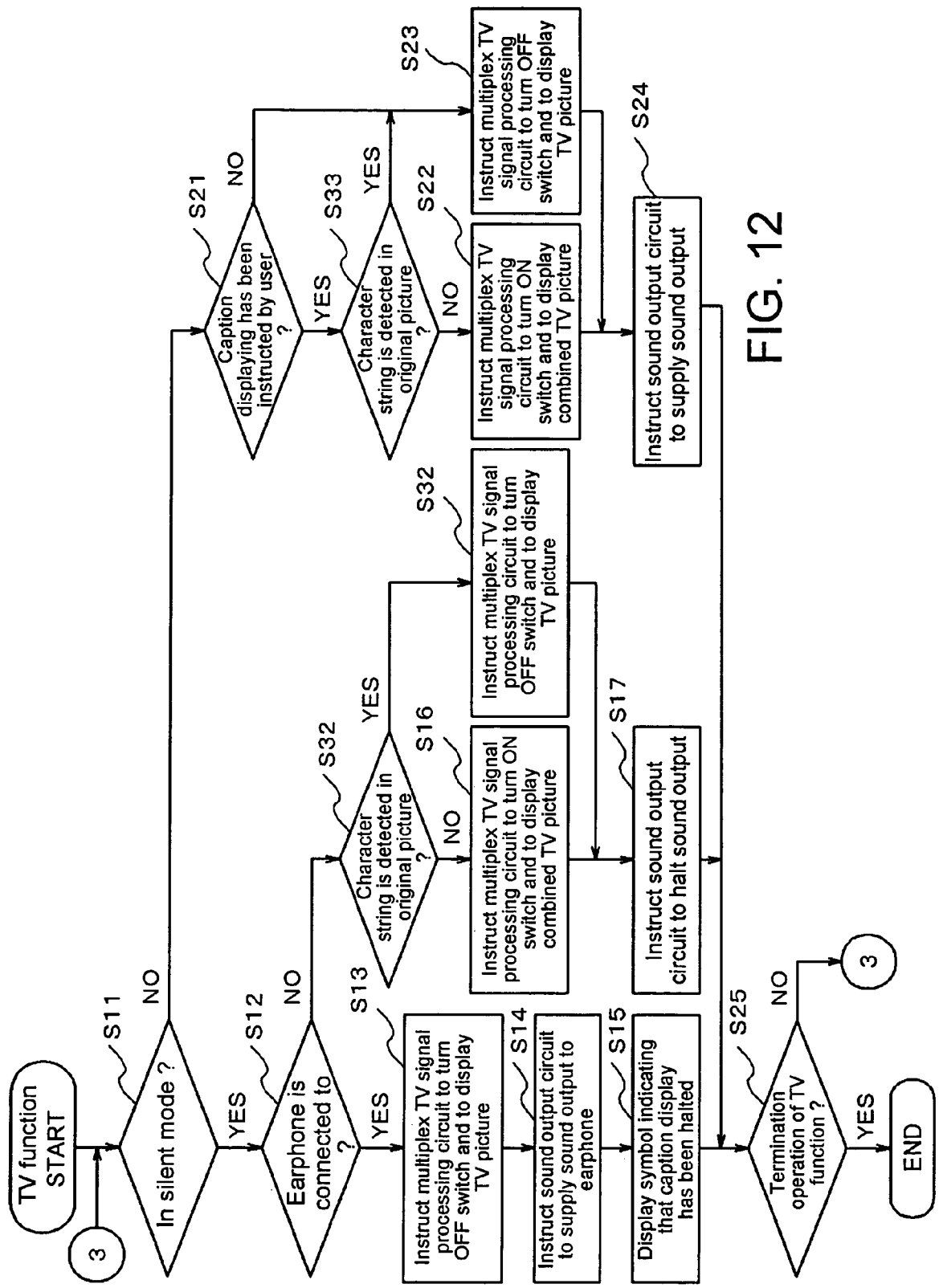
FIG. 12 is a flow chart showing the control process when the TV function has been selected in the portable telephone of the third embodiment.

Operation Control Process:

FIG. 12 shows the control process when the TV function is selected in the portable telephone of the third embodiment. The flow chart shown in FIG. 12 shows the processing of the software program that is executed by CPU 21 in the present embodiment. The composition of the process shown in FIG. 12 adds the processes of Step S31 to S33 to the procedure shown by FIG. 4 in the first embodiment.

When the connection of earphone 10 is detected in Step S12, CPU 21 of control circuit 1 refers to the state of detection realized by character detection circuit 42 in Step S31, and thus determines whether a character string is originally contained in the TV video frames that are to be displayed. If CPU 21 does not detect the existence of a character string in Step S31, the process advances to Step S16 to display a combined TV picture (see FIGS. 6 and 7) as in the first embodiment.

On the other hand, if CPU 21 detects the existence of a character string in Step S31, CPU 21 instructs multiplex TV signal processing circuit 2 in Step S32 to both turn OFF switch (SW) 35 and display a TV picture. In accordance with these instructions, the supply of the caption information from caption extraction circuit 33 is halted, and picture combining circuit 34 supplies display device 12 with video information having the same content as a video signal that has been extracted from the multiplexed TV signal, i.e., a video signal that produces a picture containing a character string. Thus, in this case, a TV picture containing a character string is displayed on display 13 in the display manner shown in FIG. 5. As a result, the overlap of an originally existing character string and a caption can be prevented. The process then transitions to Step S17.

Based on the same reasoning, upon detecting the existence of a character string in Step S33, CPU 21 transitions to Step S23 and does not perform caption display even when the user has preset caption display in an operation mode other than the silent mode. CPU 21 transitions to Step S22 and performs caption display only when a character string has not been detected in Step S33.

Figure 13:
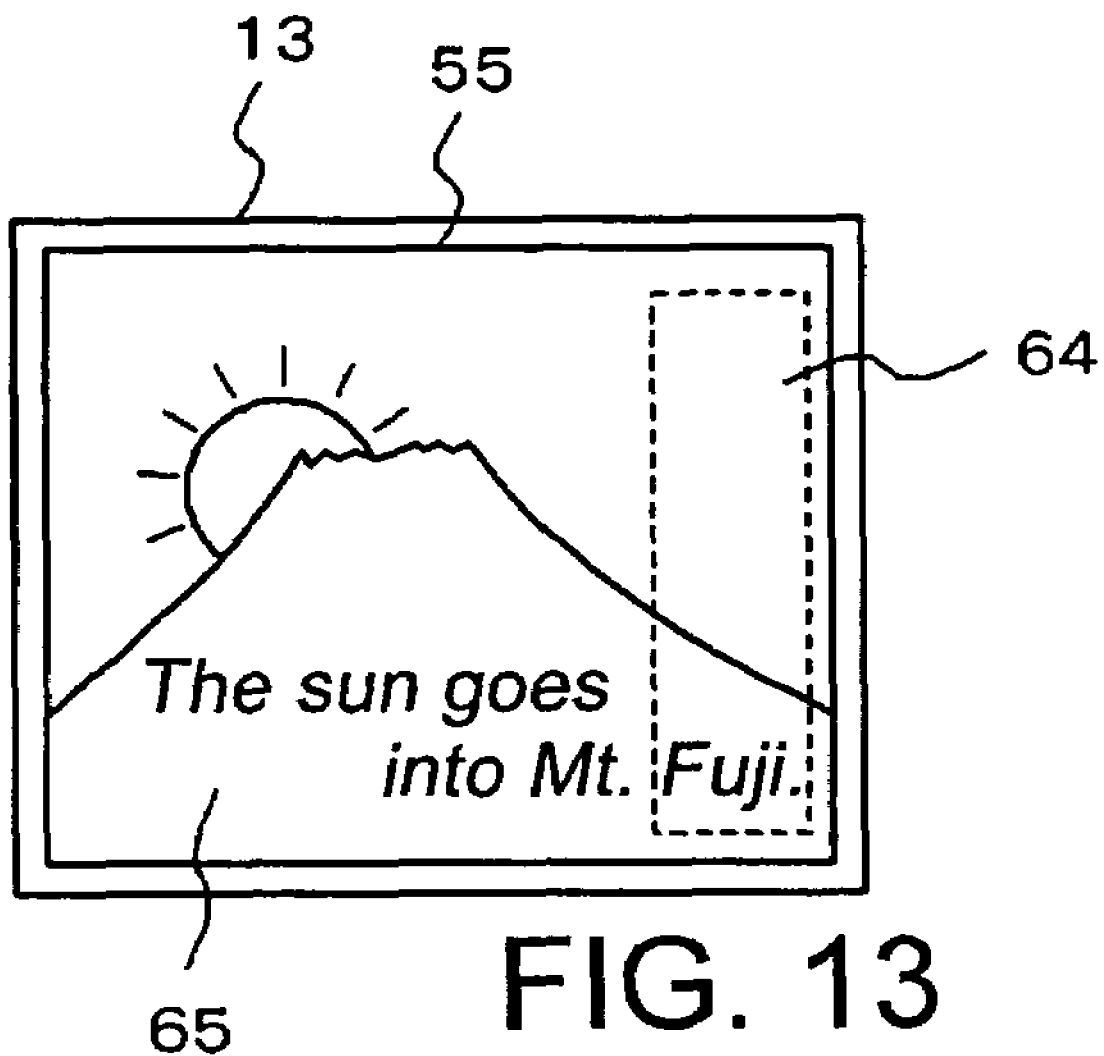
FIG. 13 is an explanatory view of the ON/OFF display of captions according to the inclusion of character strings in the original video picture when the silent mode has been selected in the portable telephone of the third embodiment.

FIG. 13 shows the ON/OFF control of caption display in accordance with the inclusion of character strings in the original picture when the silent mode has been selected, and moreover, when executing the TV function in the portable telephone of the third embodiment. In other words, in the present embodiment, when character string 65 is contained in the original picture, only this original picture 55, i.e., a TV picture that originally contains characters, is displayed. In a video frame that does not contain a character string in the original picture, a caption is displayed in caption display area 64.

Thus, the present embodiment can precisely and dynamically prevent overlapping in the displayed TV picture between a character string originally contained in this TV picture and a caption based on a caption signal that has been extracted from the received multiplexed TV signal. In this way, the user can, by referring to a TV picture that originally contains these character strings or to a TV picture in which a caption has been combined, easily and reliably comprehend the content of the TV program that is being reproduced on display 13 in a case in which the TV function is used while the silent mode has been selected and while earphone 10 is not in use.

Modification of Third Embodiment

In the above-described third embodiment, a process was realized for dynamically switching between displaying and not displaying captions according to the absence or presence of character strings in the original picture. In this modification, this dynamic switching process is applied to the above-described second embodiment, i.e., the conversion of the aspect ratio. In this case, aspect ratio conversion circuit 36 similar to that of multiplex TV signal processing circuit 2A in the second embodiment (see FIG. 8) is further provided at the same position in the circuit configuration of multiplex TV signal processing circuit 2B, and switch 35 is eliminated. CPU 21 of control circuit 1 may then realize a display state in which the aspect ratio has been converted (see FIG. 10) only when a character string in the original picture is detected by character detection circuit 42.

By means of this modification, the user is again able to easily and reliably comprehend the content of a TV program that is being reproduced.

Fourth Embodiment

The explanation next regards the fourth embodiment of the present invention.

In the above-described first to third embodiments, a portable telephone was described that has a TV reception function for receiving a multiplexed TV signal. However, the range of application of the present invention is not limited to a TV reception function, and can be further applied to a portable telephone having a function for reproducing content information in which a video, sound, and a caption have been multiplexed (combined).

In the fourth embodiment, explanation regards a portable telephone having a content information reproduction function that takes as a basis portable telephone 100 of the above-described first embodiment.

The following explanation focuses on the characteristic parts of the portable telephone of the fourth embodiment. Elements that are equivalent to those of the above-described first embodiment are given the same reference numerals, and redundant explanation is omitted.

Figure 14:
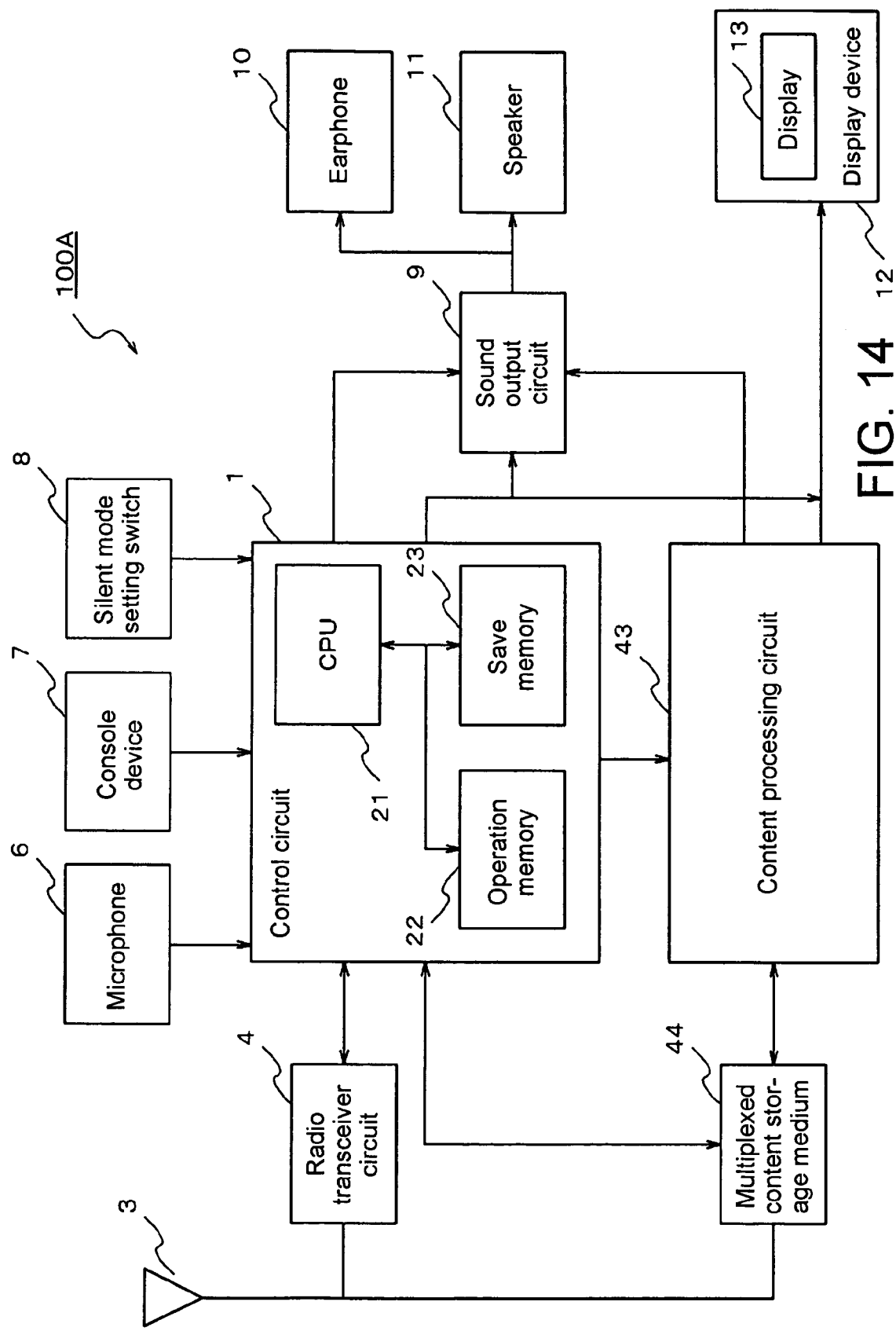
FIG. 14 is a block diagram showing the overall configuration of the portable telephone of a fourth embodiment of the present invention that has a multiplex content reproduction function.

Device Configuration of Portable Telephone 100A:

FIG. 14 shows the overall configuration of portable telephone 100A of the fourth embodiment that has a function for reproduction of multiplexed content. This portable telephone 100A is provided with a circuit configuration that is basically equivalent to that of portable telephone 100 of the first embodiment (see FIG. 1). However, the object of reproduction in portable telephone 100A is not a multiplexed TV signal, but rather, multiplexed content information that has been stored in advance in multiplexed content storage medium 44, and portable telephone 100A is therefore provided with content processing circuit 43 in place of multiplex TV signal processing circuit 2. In addition, in the interest of simplifying the explanation, portable telephone 100A is not provided with TV tuner circuit 5.

Multiplexed content storage medium 44 represents a storage medium such as an IC (integrated circuit) card that can be installed in or removed from portable telephone 100A, or a storage medium such as a readable/writable flash memory provided inside portable telephone 100A.

In this case, multiplexed content, i.e., a multiplexed content file, that is stored in multiplexed content storage medium 44 may include material that has been acquired by radio communication by way of antenna 3 and material that has been written by an external device (not shown) in a detached state from portable telephone 100A. This multiplexed content is represented by a data file in which video information (video data), sound information (sound data), and caption information (caption data) have been multiplexed based on a prescribed format. In this case, the caption information includes character codes that produce captions and the control codes (i.e. tag codes) for displaying these captions.

Circuit Configuration of Content Processing Circuit 43:

FIG. 15 shows the internal configuration of the content processing circuit provided in portable telephone 100A. Content processing circuit 43 is provided with a circuit configuration that is similar to multiplex TV signal processing circuit 2 that was described in the first embodiment (see FIG. 2). However, this embodiment differs from the first embodiment in that the content has already been digitized when it is read from multiplexed content storage medium 44. In other words, content processing circuit 43 is provided with sound information processing circuit 45, video information processing circuit 46, caption information extraction circuit 47, picture combining circuit 48, and switch (switch element) 49.

Sound information processing circuit 45 both reads sound information from multiplexed content storage medium 44 and performs processes such as level conversion in accordance with the instructions of control circuit 1 upon the sound information that has been read. The digital sound signal (sound information) that has undergone processing in sound information processing circuit 45 is supplied to sound output circuit 9.

Video information processing circuit 46 reads video information from multiplexed content storage medium 44, separates luminance information (Y) and color information (C) from the video information that has been read, and supplies the information to picture combining circuit 48.

Caption information extraction circuit 47 both reads character information (character codes) for captions from multiplexed content storage medium 44, and supplies the read character information to picture combining circuit 48 by way of switch 49. The content of the captions typically relates to the content of the video frames to which the captions belong.

Switch 49 performs an ON/OFF operation in accordance with the instructions of control circuit 1 to switch between supplying and halting the supply of caption information (character codes) to picture combining circuit 48.

When switch 49 is in the ON state, picture combining circuit 48 converts character codes that have been supplied by caption information extraction circuit 47 to video information of character patterns that correspond to the character codes. Picture combining circuit 48 then combines the video information of the character patterns with video information that has been supplied by video information processing circuit 46 to thus generate video information of the content picture that is to be displayed on display 13. When switch 49 is in the OFF state, on the other hand, picture combining circuit 48 uses only the video information that has been supplied by video information processing circuit 46 to generate the video information of the content picture that is to be displayed on display 13. Picture combining circuit 48 converts video information to an RGB signal as necessary in accordance with the specifications of display device 12.

The functions of content processing circuit 43 provided with this configuration may be realized by software that is executed by CPU 21 in control circuit 1.

Operation Control Process:

The operation control process in portable telephone 100A of the fourth embodiment can adopt substantially the same form as the control process in the above-described first embodiment. However, in the present embodiment, a portion of the expressions in the processing steps in each flow chart differ because the object of processing is a content picture and not a TV picture.

In portable telephone 100A, a control process (see FIG. 4) is adopted according to the presence or absence of an earphone as explained in the first embodiment. In this case, however, the control process is executed when the content reproduction function has been selected and not when the TV function has been selected. In addition, the object of control of CPU 21 is content processing circuit 43 and not multiplex TV signal processing circuit 2.

By performing this control process, portable telephone 100A displays a combined content picture including a caption on display 13 in place of the sound output from speaker 11 when the silent mode has been selected, the content reproduction function is being executed, and further, earphone 10 is not connected. The user is thus able to easily and reliably comprehend the content that is being reproduced even when the silent mode has been selected.

Modification of the Fourth Embodiment

A device configuration can be hypothesized for portable telephone 100A of the fourth embodiment that both adopts the control process that was described in the second embodiment in which the aspect ratio of the picture is changed (see FIG. 9) and that employs aspect ratio conversion circuit 36 (see FIG. 8). However, the aspect ratio may be converted by picture combining circuit 48 and the aspect ratio conversion circuit may not be provided. This device configuration can prevent overlapping in the content picture between character strings originally contained in the content picture and captions based on character codes. In this case, however, the object of control of CPU 21 is not multiplex TV signal processing circuit 2A, but rather, a content processing circuit (not shown) that takes content processing circuit 43 (see FIG. 15) as its basic configuration, and further, that is provided with the same functions as aspect ratio conversion circuit 36.

Based on the same thinking, a device configuration can also be hypothesized for portable telephone 100A according to the fourth embodiment that both adopts the control process that was described in the third embodiment in which character strings are detected (see FIG. 12) and employs picture memory 41 and character detection circuit 42 (see FIG. 10). However, characters may be detected by picture combining circuit 48 and the character detection circuit may not be provided. This type of device configuration can precisely and dynamically prevent overlapping in the content picture that is displayed between a character string originally contained in the content picture and a caption based on character codes that have been extracted from the multiplexed content information. The user is thus able to easily and reliably comprehend the content that is being reproduced on display 13 by referring to the character string or caption when the silent mode has been selected, the content reproduction function is in use, and earphone 10 is not being used. In this case, however, the object of control of CPU 21 is not multiplex TV signal processing circuit 2B, but rather, a content processing circuit (not shown) that takes content processing circuit 43 (see FIG. 15) as its basic configuration, and further, that is provided with functions that are similar to those of picture memory 41 and character detection circuit 42.

The portable telephone according to each of the above-described embodiments and modifications enables the user to easily and reliably comprehend the content that is being reproduced by means of content picture in which a caption has been combined even when the silent mode has been selected that halts the output of sound from at least the speaker.

The present invention that has been described using the examples of each of the above-described embodiments is achieved by first supplying, to the above-described portable telephones (100 and 100A), computer programs that can realize the functions of the flow charts that were referred to in each of the explanations, and then by the reading and execution of these computer programs by the CPUs of the devices.

In addition, the computer programs that have been supplied in each of these devices may be stored in a storage device such as a readable/writable memory.

The method of supplying the computer program to each of the devices in the previously described cases can be a currently typical procedure, such as a method in which the computer program is installed in the device using suitable implements in a fabrication stage before shipment or in a maintenance stage following shipment, or a method in which the computer program is downloaded from the outside by way of a communication line such as the Internet. In such cases, the present invention can be constituted by the code of the computer program or by the storage medium. Therefore, program products in which such a computer program is stored are included in the scope of the present invention.

In addition, in each of the above-described embodiments, the explanation regarded applications to portable telephones having a TV reception function or content reproduction function as the example of the portable terminal of the present invention. However, the range of application of the present invention is not limited to a portable telephone, and the present invention can also be applied to any device having a content reproduction function such as a TV reception function in a portable terminal such as a PDA or a portable game device. The present invention is particularly effective when applied to a portable terminal that is constrained to using a compact display because the case of the device has been reduced in size to facilitate transport by the user.

While a preferred embodiment of the present invention has been described using specific terms, such description is for illustrative purposes only, and it is to be understood that changes and variations may be made without departing from the spirit or scope of the following claims.

What is claimed is:

1. A portable terminal having a content reproduction function, said portable terminal comprising:
   a speaker;
   a display; and
   a control means for, when said reproduction function is being executed in a state in which an operation mode for halting output of sound from said speaker has been selected, both halting output of sound from said speaker and displaying on said display a video picture and a caption relating to said video picture,
   wherein said control means, when an earphone is connected to said portable terminal when said reproduction function is being executed in the state in which said operation mode has been selected, halts output of sound from said speaker and performs output of sound to said earphone, and further, halts display of captions on said display.

2. A portable terminal having a content reproduction function, said portable terminal comprising:
   a speaker;
   a display; and
   a control means for, when said reproduction function is being executed in a state in which an operation mode for halting output of sound from said speaker has been selected, both halting output of sound from said speaker and displaying on said display a video picture and a caption relating to said video picture,
   wherein
   said control means includes a character detection means for detecting a character string contained in a video picture that is to be displayed; and
   when executing said reproduction function in the state in which said operation mode has been selected, said control means, in accordance with the detection of a character string by said character detection means, halts display of said caption and displays a video picture including the character string on said display.

3. A method for controlling a portable terminal having a content reproduction function, said method comprising the step of:

when said reproduction function is being executed in a state in which an operation mode for halting output of sound from a speaker has been selected, halting output of sound from said speaker while displaying on a display a video picture and a caption that is relevant to the video picture, wherein, when an earphone is connected to said portable terminal when said reproduction function is being executed in the state in which said operation mode has been selected output of sound from said speaker is halted, and output of sound to said earphone is implemented, and further, display of captions on said display is halted.

4. A method for controlling a portable terminal having a content reproduction function, said method comprising the step of:

when said reproduction function is being executed in a state in which an operation mode for halting output of sound from a speaker has been selected, halting output of sound from said speaker while displaying on a display a video picture and a caption that is relevant to the video picture, detecting whether a character string is included in the video picture that is to be displayed, and in accordance with the detection of a character string included in said video picture, halting the display of said caption and displaying on said display a video picture including the character string.

5. A computer program for causing a computer for operation control of a portable terminal having a content reproduction function to execute processing for:

when said reproduction function is being executed in a state in which an operation mode for halting the output of sound from a speaker has been selected, halting output of sound from said speaker while displaying on a display a video picture and a caption that is relevant to the video picture, when an earphone is connected to said portable terminal when said reproduction function is being executed in the state in which said operation mode has been selected, halting output of sound from said speaker, implementing output of sound to said earphone, and further, halting display of captions on said display.

6. A computer program for causing a computer for operation control of a portable terminal having a content reproduction function to execute processing for:

when said reproduction function is being executed in a state in which an operation mode for halting the output of sound from a speaker has been selected, halting output of sound from said speaker while displaying on a display a video picture and a caption that is relevant to the video picture, when said reproduction function is being executed in the state in which said operation mode has been selected, detecting whether or not a character string is contained in the video picture that is to be displayed; and in accordance with the detection of a character string contained in said video picture, halting display of said caption, and displaying on said display a video picture including the character string.

* * * * *